United States Patent
Giles et al.

[15] 3,691,342
[45] Sept. 12, 1972

[54] ELECTRIC SOLDERING IRONS

[72] Inventors: Walter W. Giles; Norman W. Madden, both of 2631 Locksley Place, Los Angeles, Calif. 90039

[22] Filed: March 9, 1970

[21] Appl. No.: 17,533

[52] U.S. Cl. .................219/233, 219/227, 219/229, 219/238, 219/240, 219/533
[51] Int. Cl. ....................B23k 3/04, H05b 1/00
[58] Field of Search.................219/221, 227–233, 219/235–242, 533; 228/51–55

[56] References Cited

UNITED STATES PATENTS

| | | | |
|---|---|---|---|
| 1,820,799 | 8/1931 | Hazlett et al. | 219/240 |
| 2,619,576 | 11/1952 | Griebach | 219/235 X |
| 2,667,561 | 1/1954 | Schoenwald | 219/240 |
| 2,680,187 | 6/1954 | Anton | 219/235 |
| 2,709,743 | 5/1955 | Mitchell | 219/235 X |
| 3,002,077 | 9/1961 | Caliri | 219/229 X |

*Primary Examiner*—A. Bartis

[57] ABSTRACT

An improved electric soldering iron of a type operable by one hand and adapted for working in restricted places with (1) safety to adjacent material and (2) minimal transference of heat from a heating element to the handle of the device, these aims being achieved by a specially structured tube of very small diameter and great length extended from the handle of the device and attached at the forward end to the soldering tip, with ventilating means being provided adjacent the tip to further reduce the transfer of heat from the tip to the handle.

2 Claims, 6 Drawing Figures

PATENTED SEP 12 1972 3,691,342
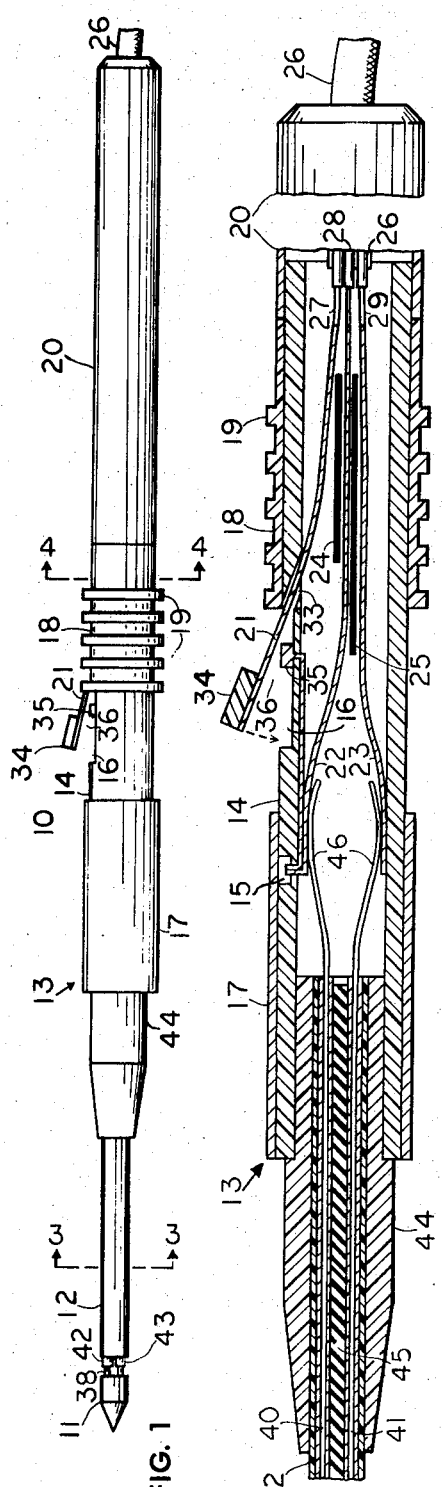
INVENTOR:
Norman W. Madden
Walter W. Giles

ELECTRIC SOLDERING IRONS

This invention relates to an improved soldering iron, and more particularly to a light-duty soldering iron adapted to work in hard-to-reach places and one in which heat generated by an electric heating element is concentrated in the soldering tip with minimal transfer to the handle or the possibility of damage to nearby material. In the prior art relating to soldering irons of the class described here, the elongate tubular member conventionally attaching the soldering tip to the handle is, because of construction difficulty, usually made too large in diameter to allow insertion of the tip into constricted places; if made sufficiently small in diameter to allow such insertion, the elongate member, as it is commonly constructed, will not be rigid enough for practical use. In the present invention the elongate tubular member is an assembly of two thin-walled steel tubes, each very small in diameter, within a thin-walled tube of dielectric material. This construction makes maximal rigidity possible in a member both small in diameter, and of great length. An exposed space between the soldering tip and the terminal portion of the elongate tubular member, not found in prior-art designs of electric soldering irons improves ventilation and permits the radiation of heat before it can be conducted to the handle of the device. A further improvement in the inventive combination is the doubling of one side of the soldering iron's electric circuit, one branch of a parallel allowing an extra flow of current in the heating element to raise the working tip to soldering temperature at moments of use.

The invention will be more clearly understood from the following description considered in connection with the accompanying drawings, in which:

FIG. 1 is a side elevational view of a preferred embodiment of the invention.

FIG. 2 is an enlarged side elevational view, in longitudinal section and partly broken away, showing details of the embodiment in FIG. 1.

FIG. 3 is an enlarged sectional view taken on the line 3—3 of FIG. 1 looking in the direction of the arrows.

FIG. 4 is an enlarged sectional view taken on the line 4—4 of FIG. 1 looking in the direction of the arrows.

FIG. 5 is a diagram of the electrical circuit in the device shown in FIGS. 1 and 2.

FIG. 6 is an enlarged longitudinal sectional view of the soldering tip in a modification of the preferred embodiment of the invention.

Referring now to the drawings, there is shown in FIGS. 1 and 2 a soldering iron 10 which consists in general of a soldering tip 11, an elongated forwardly projecting tube 12 with enclosed elements to be described, a handle assembly 13, and a cord 26 enclosing conductive leads of the device.

The handle assembly 13, seen in enlarged detail in FIG. 2, includes an elongated handle member 14 of plastic dielectric material, generally tubular in form but exteriorly and transversely recessed at 15 and 16. A bushing 44 of rigid plastic material is force-fitted into the forward end of the bore of the tubular handle member 14 and a fairing sleeve 17 of metallic or plastic material positioned upon the outer forward portion of the member, shielding the recessed area 15. An outer sleeve of plastic dielectric material 18, with a plurality of ribs 19, as seen in FIGS. 1 and 2, providing a firm grip for the thumb and second finger of the operator's hand, is cemented or otherwise fixed concentrically upon the mid-portion of the handle member 14. An elongated outer sleeve 20 of metallic or other rigid material composing the rearmost portion of the handle assembly 13 is fixed by set-screw or other conventional means concentrically upon the tubular handle member 14 rearward of the sleeve 18.

Longitudinally disposed within the bore of the handle member 14 are electrical conductors 21, 22, and 23, preferably fabricated of thin strips of Sterling silver and insulatively separated by strips of dielectric material 24 and 25. Conductors 21, 22, 23 are connected respectively to leads 27, 28, 29 enclosed by the cord 26. Conductor 22 and its extension lead 28 are circuited through a rheostat 30 (see FIG. 5) to junction with lead 27 in forming one branch of a loop circuit which is connected through a step-down transformer 31 to a conventional 110-volt alternating current outlet 32. Conductor 21 is curved upwardly at the forward end through an exit passage 33 in the tubular structure of the handle member 14 to terminate in a button of dielectric material 34. When the button 34 is depressed by the forefinger of the soldering iron's operator, the thin conductor 21 is flexed downwardly to contact the electrode 35 that terminates conductor 22. When pressure is released on the button 34, spring reaction of the conductor 21 opens the circuit. Thus the combination of an electrode and a flexible conductor of spring material constitutes a finger-operatable off-and-on switch 36 that controls a branch of the circuit bypassing the rheostat 30, with advantages to be further recited.

The soldering tip 11 of FIGS. 1 and 2, preferably of copper or the like, is comparatively small, overall dimensions being in desired cases no more than ⅛ × ⅜ inches, and is conically or other wise tapered at the working end. A longitudinal bore 37 that extends well into the tapered portion of the tip, leaving only a thin shell of material surrounding the bore, accommodates closely a looped electric heating element 38. The heating element 38 is fixed within the bore 37 and the cavity filled by an inclusion of thermally conducting dielectric cement or potting material 39, which electrically insulates the heating element from the copper tip but insures maximum conduction of heat thereto. A slight distance rearward of the tip 11 the terminals of the element 38 are silver-soldered or otherwise conductively joined to conductors 40, 41 and fixed to a depth of about 3/32 of an inch within the bores of the tubes 42 and 43, which are preferably of thin-walled stainless steel and which, because of their tubular structure, impart great rigidity to the tube 12 in which they are disposed. In a preferred embodiment of the invention the heating element 38 is attenuated in cross section in the portion 38-A within the bore 37, creating higher resistance there and as a result confining most of the heat generated by the element to the soldering tip where it is needed.

The tube 12, an inherently rigid member preferably constructed of Formica or similar material of dielectric nature, is fixed in the bore of a bushing 44 with major axis aligned in respect to the longitudinal axis of the whole device. The thin-walled steel tubes 42 and 43, separated by an insulating member of dielectric material 45, are tightly disposed within the bore of tube 12 as seen in FIGS. 2 and 3. Conductors 40 and 41, preferably of silver spring wire, lead through the bores of tubes 42 and 43 in conductive contact with the inner wall surfaces thereof. At their forward ends the conductors are joined to the terminals of the heating element 38; at their rearward ends they diverge as a wide prong 46, the legs of which when forced into the bore of the tubular handle member 14 exert spring pressure outward, making conductive contact with the forward terminals of the conductors 22 and 23 as seen in FIG. 2. Since the tube 12 can feasibly be made with a diameter of less than 3/32 of an inch and may have a length of 10 inches or more and, aided by the enclosed tubular members 42 and 43, still retain satisfactory rigidity, it is possible to reach deeply with the soldering iron and solder in small spaces normally difficult of access. Another advantage in the construction of tube 12 is that by lengthening the path of heat conduction from the soldering tip 11 to the handle assembly 13 heat transfer thereto is minimized.

If in using an electric soldering iron the full current of heating is turned on and the high temperature required for soldering maintained for long periods, the tip and adjacent members may be damaged. This disadvantage is eliminated in the present invention by provision of the dual circuit previously mentioned. In using the device described here the operator switches on the supply current at the source connection and adjusts the rheostat 30 to permit a flow of current sufficient to bring the heating element 38 and the tip 11 to just below soldering temperature. Thus the soldering iron may be readied for use and held at a safe standby temperature for an indefinite time. When actual soldering begins, the operator by finger pressure on the switch 36 closes the circuit that by-passes the rheostat 30 through conductor 21 and its lead 27, full current is allowed through the heating element 38, and instantly the tip 11 is raised to soldering temperature. When the soldering pass is completed, the operator releases pressure on the switch button 34, and the tip heat drops immediately to standby temperature. This provision not only prevents deterioration of the soldering tip from long-continued heating but prevents any uncomfortable buildup of conducted heat in the part of the handle held by the operator.

It has been shown that attenuating the cross section of the heating element 38 in the portion within the tip 11 aids in confining the heat generated by the element largely to the area where it is required. This result can also be achieved by use of a fine wire of uniform gage throughout the element. Such a modification is illustrated in the enlargement FIG. 6 wherein the heating element of uniform gage is designated as 38–1.

What is claimed:

1. A soldering iron comprising: an elongate tubular handle member of dielectric material having an interior defined by a longitudinal bore, said bore having a rearward end closure and a forward end opening provided with a bushing in which is fitted coaxially with the handle member the rearward portion of an elongate forwardly projecting tube of dielectric material, said tube being of substantially lesser diameter than said handle member; a metallic soldering tip having an elongate longitudinal bore closed at the forward end and open at the rearward end; a loop type electrical heating element having integral terminal portions, said heating element being fixed by thermally conductive cement within the bore of the soldering tip in heat transfer relationship therewith, the terminal portions of the heating element extending a distance rearwardly outside the soldering tip and parallel to longitudinal axis of the tip each terminal portion being fixed within a forward end opening of a thin-walled steel tube, the said steel tubes being separated from each other by dielectric material and disposed tightly and parallel within the bore of the aforesaid forwardly projecting tube of dielectric material, the terminal portions of the said heating element being joined to a pair of resilient conductors of high conductivity leading through the bores of the steel tubes aforesaid, the said conductors being extended rearwardly from the steel tubes and sprung apart to form a resilient pronged electrical connector; the forward end of each member of a second pair of conductors longitudinally disposed within the bore of the handle member making conductive union with a sprung-apart leg of the pronged electrical connector aforesaid, the second pair of conductors being circuited through a finger-operated switch and led in an insulated cord through a port in the rearward end closure of the handle member to a source of electrical power.

2. The soldering iron of claim 1, wherein the rearward end of the soldering tip is longitudinally spaced apart from the forward ends of the thin-walled steel tubes and the forwardly projecting tube of dielectric material, for ventilating the spaced-apart area and materially reducing the transfer of heat from the heated soldering tip and adjacent parts to the tubular handle member.

* * * * *